US011059679B2

(12) United States Patent
Landler et al.

(10) Patent No.: US 11,059,679 B2
(45) Date of Patent: Jul. 13, 2021

(54) DEVICE FOR SUPPLYING CONTAINERS TO A CONTAINER HANDLING DEVICE AND FILLING SYSTEM

(71) Applicant: KRONES AG, Neutraubling (DE)

(72) Inventors: Bruno Landler, Neutraubling (DE); Manfred Schmid, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/870,261

(22) Filed: May 8, 2020

(65) Prior Publication Data

US 2020/0354159 A1 Nov. 12, 2020

(30) Foreign Application Priority Data

May 10, 2019 (DE) ..................... 10 2019 112 293.7

(51) Int. Cl.

*B65G 47/64* (2006.01)
*B65G 21/20* (2006.01)
*B65B 1/04* (2006.01)

(52) U.S. Cl.

CPC ....... *B65G 47/647* (2013.01); *B65G 21/2072* (2013.01); *B65B 1/04* (2013.01); *B65G 2201/0235* (2013.01); *B65G 2203/0283* (2013.01); *B65G 2203/044* (2013.01); *B65G 2203/045* (2013.01)

(58) Field of Classification Search

CPC .......... B65G 47/647; B65G 2201/0235; B65G 2203/0283; B65G 2203/044; B65G 2203/045; B65G 21/10; B65G 47/66; B65G 47/846; B65G 21/2072; B67C 3/22; B67C 7/0046; B65B 1/04

USPC ..................... 198/369.2, 836.1, 836.3, 836.4

See application file for complete search history.

(56) References Cited

U.S. PATENT DOCUMENTS 3,860,104 A * 1/1975 Strauss .................. B65G 47/61 198/459.3
3,863,753 A * 2/1975 Shank, Jr. ............... B65B 21/12 198/680
3,944,058 A 3/1976 Strauss
4,098,932 A * 7/1978 Frische ............... B05B 13/0235 118/322

(Continued)

FOREIGN PATENT DOCUMENTS

DE 102013110161 6/2016
DE 102015106788 11/2016

(Continued)

OTHER PUBLICATIONS

Search Report dated Jan. 31, 2020, German Application No. 102019112293.7, 5 pages.

(Continued)

*Primary Examiner* — Mark A Deuble

(74) *Attorney, Agent, or Firm* — Haynes and Boone LLP

(57) ABSTRACT

A device for supplying containers to a container handling device, for example to a container filling device for filling containers with a liquid filling product, includes a guide which is arranged at a predetermined guide height level for guiding a container on the container base thereof. The guide has a transfer portion for transferring the container to a receiving device of the container handling device, and the transfer portion is height-adjustable. A filling system including such a device is also described.

18 Claims, 6 Drawing Sheets

(56) References Cited

U.S. PATENT DOCUMENTS

| | | | | |
|---|---|---|---|---|
| 5,630,679 | A * | 5/1997 | Simkowski | B65G 51/035 406/196 |
| 9,670,001 | B2 * | 6/2017 | Doherty | B65G 21/2072 |
| 2011/0127143 | A1 | 6/2011 | Calzolari et al. | |
| 2011/0286825 | A1 | 11/2011 | Michels | |
| 2013/0313081 | A1 | 11/2013 | Krulitsch et al. | |
| 2015/0008099 | A1 * | 1/2015 | Huettner | B65G 21/2072 198/717 |
| 2015/0344237 | A1 * | 12/2015 | Papsdorf | B65G 29/00 198/473.1 |
| 2016/0145090 | A1 | 5/2016 | Fahldieck et al. | |
| 2016/0194155 | A1 * | 7/2016 | Doherty | B65G 21/2072 198/723 |
| 2018/0265301 | A1 * | 9/2018 | Anderson | B65G 29/00 |

FOREIGN PATENT DOCUMENTS

| | | | |
|---|---|---|---|
| EP | 0734998 | 10/1996 | |
| EP | 2615046 | 7/2013 | |
| JP | 05221515 A * | 8/1993 | B65G 51/035 |
| WO | WO 2017/190853 | 11/2017 | |

OTHER PUBLICATIONS

Extended European Search Report dated Oct. 9, 2020, European Patent Application No. 20173953.9, 9 pages.

* cited by examiner 1
2
4
8
5
21
22
23
24
25
26
27
28
28
50

DEVICE FOR SUPPLYING CONTAINERS TO A CONTAINER HANDLING DEVICE AND FILLING SYSTEM

CROSS REFERENCE TO RELATED APPLICATIONS

This application claims priority from German Patent Application No. DE 10 2019 112 293.7, filed on May 10, 2019 in the German Patent and Trademark Office, the disclosure of which is incorporated herein by reference in its entirety.

BACKGROUND

Technical Field

The present invention relates to a device for supplying containers to a container handling device, for example to a container filling device for filling containers, such as for example cans, with a liquid filling product, as well as a filling system, for example a filling system for filling cans.

Related Art

It is known to handle containers in different container handling devices. Such container handling devices may be configured, for example, in the form of filling devices for filling the containers with a flowable filling product, closure devices for closing the filled containers, labelling devices or devices for printing the containers.

In particular in the case of filling devices, these devices often have a filling carousel which rotates about a rotational axis, a plurality of filling members which undertake the actual filling of the containers being arranged on the periphery thereof.

For supplying the containers to be handled to the respective container handling device it is known to provide a device for supplying the containers. This device may have a guide which predetermines a height level of the containers to be supplied, wherein this height level is adapted to a receiving height level of a guide of the container handling machine receiving the containers.

During the operation of the container handling device, in particular when this device is configured as a filling device, it typically leads to an alteration in the temperature—generally the heating—of the container handling device, which results in a thermal expansion of the container handling device.

In order to compensate for this thermal expansion, in carousel-type filling devices it is known to undertake a radial displacement of a transport star relative to the filling device, as is disclosed for example in DE 10 2013 110 161 B4. As a result, it is possible to compensate for an increase in the diameter of the filling device which has occurred due to the thermal expansion.

It may be derived from DE 10 2013 110 161 B4 that the container guide of the inlet star and the container guide of the filling device are arranged at different height levels, wherein the difference is compensated by lifting and/or lowering the containers which are transferred in the direction of the rotational axis from the guide of the inlet star to the guide of the filling device. Such lifting or lowering devices, however, increase the complexity and the weight of such systems.

In order to prevent the supplied containers from colliding with the guide of the heated filling device, it is known to position the guide height level on the inlet star to be higher by a predetermined amount than the predetermined receiving height level of the guide of the filling device. When the filling device is heated, the difference is correspondingly reduced between the guide height level and the receiving height level. In any case, in order to avoid a collision of the containers with the guide of the device, the guide height level has to be provided to be higher such that during operation a certain residual difference in height level is always present. Thus during operation the containers always tilt from the guide of the inlet star onto the guide of the filling device. In order to avoid damage to the containers by this tilting, the throughput of the containers, in other words the speed at which the containers are transferred from the guide of the inlet star to the guide of the filling device, has to be limited so that such systems have a relatively small maximum throughput.

SUMMARY

An improved device for supplying containers to a container handling device, in particular to a container filling device for filling containers with a liquid filling product, as well as a filling system, in particular a filling system for filling cans, are described herein according to various embodiments.

A device for supplying containers to a container handling device, for example to a container filling device for filling containers with a liquid filling product, for example for supplying and handling cans, is described.

Accordingly, a device is proposed for supplying containers to a container handling device, for example to a container filling device for filling containers with a liquid filling product, that includes a guide which is arranged at a predetermined guide height level for guiding a container on the container base thereof, wherein the guide has a transfer portion for transferring the container to a receiving device of the container handling device. The transfer portion is height-adjustable.

As the transfer portion is height-adjustable, this transfer portion may be adapted to and/or aligned with a receiving height level of a guide or receiving device of the container handling device. Thus the containers may be substantially at the receiving height level, at least at the end portion of the transfer portion, so that they may be transferred without a height offset, or only with a small height offset, between the transfer portion and the receiving device and/or the guide thereof.

Thus it is possible to maintain a high throughput of a system including the device in comparison with conventional systems and/or to operate these systems, irrespective of the thermal expansion of the container handling device, always at a maximum throughput and/or nominal throughput without having to tolerate damage to the containers when transferring the containers from the device to the container handling device. Thus a high throughput, or even a maximum throughput, of the system may be achieved thereby without having to provide a costly, complex and heavy lifting and lowering device. Accordingly, with a high throughput the construction of the system may be simplified and the production costs and, in particular, the operating costs may be reduced in comparison with conventional systems which have a similarly high throughput.

According to an exemplary embodiment, the transfer portion is configured such that when the transfer portion is adjusted to a height level which is different from the guide height level, viewed in the transport direction, the transfer portion continuously alters from the guide height level to the adjusted height level of the transfer portion. In other words, viewed in the transport direction the transfer portion has a start portion which is always located at the guide height level and an end portion which has the adjusted height level. The region between the start portion and the end portion in this case alters continuously from the guide height level to the adjusted height level. As a result, when passed along the transfer portion, the containers are prevented from becoming caught, canted or jammed due to a discontinuity in the path of the guide.

In various embodiments, the transfer portion is resiliently configured, wherein the transfer portion is generally configured in the form of a resilient spring element, for example a resilient spring plate, and/or the transfer portion has a recess, for example an elongated recess, extending in the transport direction for forming the resilient spring element, wherein the recess is typically of U-shaped configuration. For a transfer portion thus configured, additional add-on parts for providing the resilient transfer portion may be substantially dispensed with.

In particular, it may be advantageous if the transfer portion is integrally configured with the guide. In tests it has proved particularly advantageous if the transfer portion is configured by the elongated recess in the guide, wherein the recess is configured such that a thickness of the material of the transfer portion is small in comparison with the thickness of the guide, for example with a ratio of less than or equal to 1 to 2, such as 1 to 3, 1 to 4, 1 to 5, 1 to 6, 1 to 7, 1 to 8, 1 to 9 and in one embodiment, 1 to 10.

According to a further embodiment, an adjusting device is provided for adjusting the height level of the transfer portion, wherein the adjusting device is generally arranged below the transfer portion. By means of the adjusting device the height level may be exactly predetermined and/or adjusted.

In some embodiments, the adjusting device includes a lifting drive, for example an actuator or stepping motor. The lifting drive in this case is typically arranged such that a lift of the lifting drive effects an alteration to the height level. In certain embodiments, the amount of lift corresponds to the amount of alteration to the height level. To this end the lifting drive may advantageously be arranged below the transfer portion, for example below an end portion of the transfer portion.

In order to detect a receiving height level of a guide of the container handling machine receiving the containers, and with which the height level of the transfer portion is to be aligned, according to a further embodiment a sensor may be provided for detecting a receiving height level of a guide of the container handling machine receiving the containers, wherein the sensor is generally connected to the adjusting device, wherein the adjusting device, typically based on a value detected by the sensor, adjusts the height level of the transfer portion, for example such that the height level substantially corresponds to the receiving height level.

According to a further embodiment, the sensor is an optically measuring sensor, a mechanically scanning sensor and/or a thermal sensor, wherein the adjusting device generally has a controller/regulator which determines a predetermined value for the height level of the transfer portion based on an input signal of the sensor.

In several embodiments, a thermal sensor is provided, wherein the adjusting device generally has a controller/regulator which determines a predetermined value for the height level of the transfer portion based on an input signal of the sensor and then continuously adapts this value according to a preset time. Accordingly, by linking to the elapsed time, an adaptation of the height level may be undertaken without a renewed measurement having to be undertaken by the sensor.

In some embodiments, the sensor is designed to detect values continuously, for example at regularly spaced times and/or at predetermined time intervals or even without interruption, and the adjusting device is designed to adapt automatically the adjustment of the height level of the transfer portion based on the values of the sensor. As a result, it is possible to adapt the height level of the transfer portion automatically to the receiving height level which has been altered due to temperature alterations in the handling device. In other words, the height level of the transfer portion may always be automatically adjusted to the receiving height level which is currently present.

A filling system, for example a filling system for filling cans, is also described herein according to various embodiments.

Accordingly, a filling system is proposed, for example a filling system for filling cans, including a container handling device for handling containers, for example a filling device for filling cans. The filling system is also characterized by a device for supplying containers to the container handling device according to one of the previous embodiments.

By the provision of the device in the filling system, the advantages and effects described above regarding the device may be similarly achieved by the filling system.

BRIEF DESCRIPTION OF THE FIGURES

Further embodiments of the invention are described in more detail by the following description of the figures.

DETAILED DESCRIPTION

Figure 1:
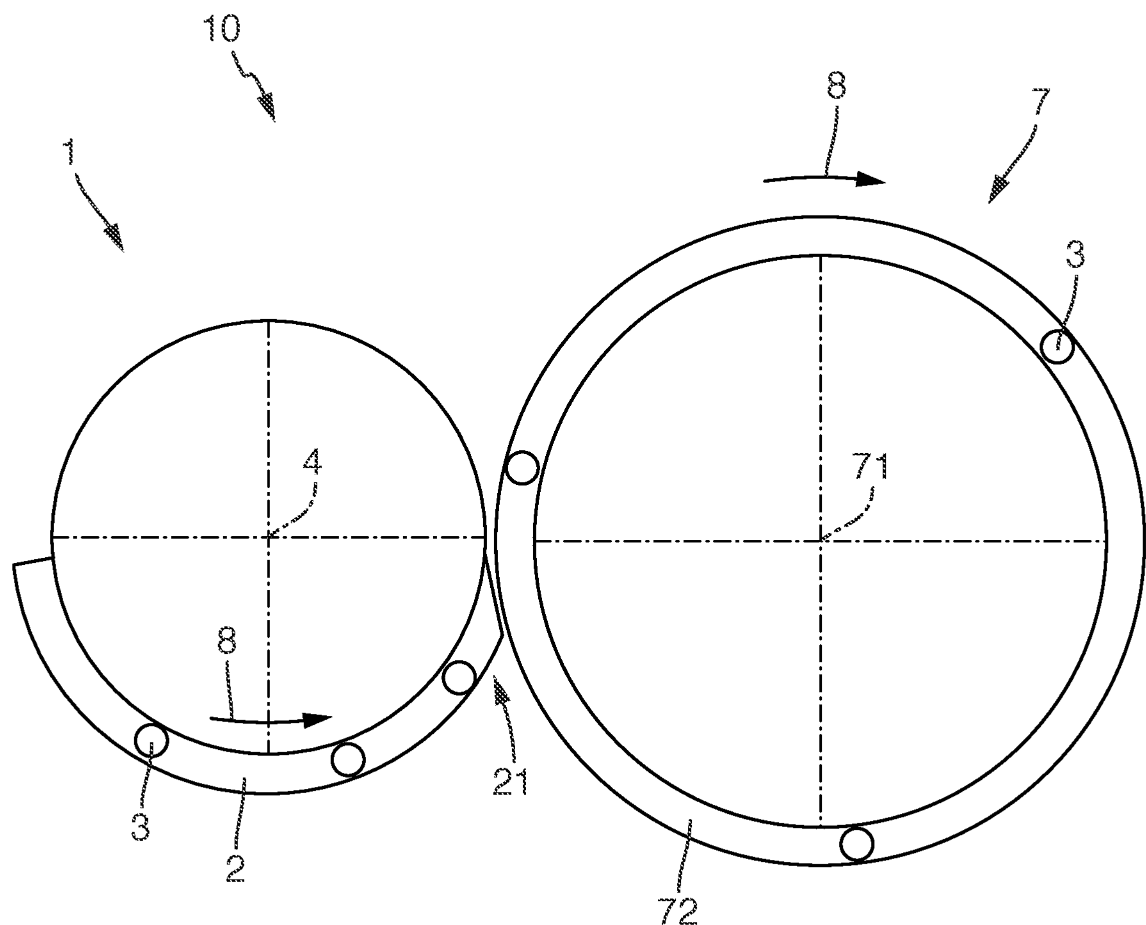
FIG. 1 shows schematically a plan view of a filling system for filling containers according to a first embodiment.

Exemplary embodiments are described hereinafter with reference to the figures. In this case, elements which are the same or similar or have the same function are provided with identical reference numerals in the various figures and a repeated description of these elements is in some cases dispensed with in order to avoid redundancy.

In FIG. 1 a plan view of a filling system 10 for filling containers 3 is shown schematically according to a first embodiment. The filling system 10 in the present case is configured for filling containers 3 in the form of cans with a liquid filling product. The filling system includes a container handling device in the form of a container filling device 7 in a carousel-type construction. The container filling device 7 is rotatable about a central rotational axis 71, wherein containers 3 to be filled are received at a receiving region for receiving the containers 3 to be filled from the container filling device 7, said containers being guided along a container guide 72 arranged toward the outside in the peripheral direction of the container filling device 7 and at the same time being filled via filling members 70 arranged on the periphery of the container filling device 7 (see FIG. 2). Subsequently, the filled containers 3 are transferred in an unloading region to an outlet star (not shown).

For supplying the containers 3 to be filled to the container filling device 7, a device 1 is provided for supplying containers 3 to the container filling device 7. The device 1 includes a guide 2 which is configured for guiding the containers 3 on the container bases thereof. The guide 2 has a transfer portion 21 for transferring a container 3 to the container filling device 7. To this end the container filling device 7 has a receiving device, not shown, which receives the containers 3 supplied to the container filling device 7 via the transfer portion 21, and transfers them to the container guide 72.

The device 1 in the present case is configured as an inlet star of carousel-type construction.

Alternatively or additionally, the outlet star may also be configured in a similar manner to the device 1. The transfer portion of the outlet star is thus configured for receiving the filled containers from the container filling device. Accordingly, the end portion of the transfer region is arranged on the container guide 72 and configured to be height-adjustable, so that the height level of the end portion is adaptable to the receiving height level 73.

Figure 2:
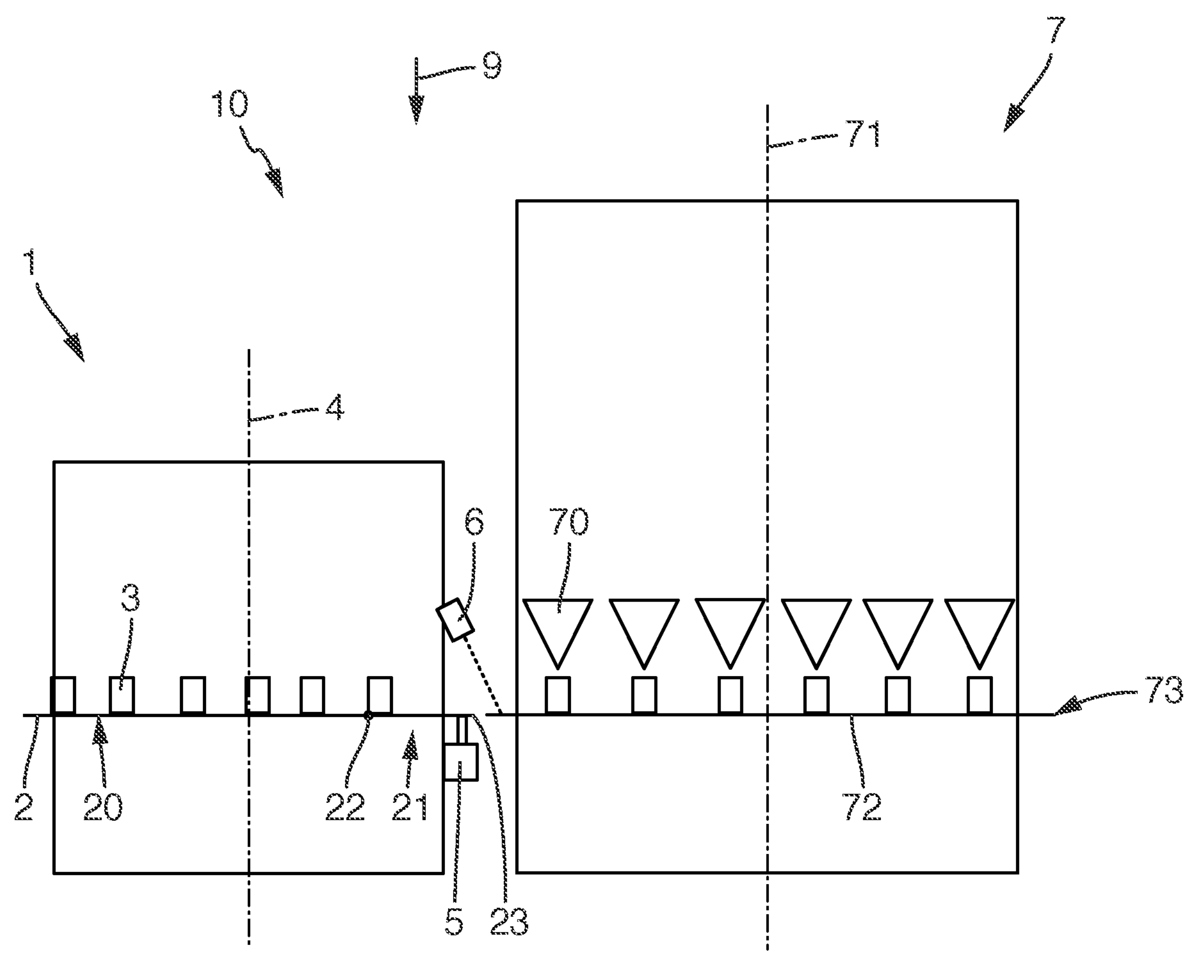
FIG. 2 shows schematically a side view of the filling system of FIG. 1.

FIG. 2 shows schematically a side view of the filling system 10 of FIG. 1. It may be clearly identified here that the guide 2 is arranged at a predetermined guide height level 20 relative to the direction of gravity 9. Similarly, the container guide 72 of the container filling device 7 is arranged at a predetermined receiving height level 73. In order to ensure a particularly gentle transfer of the containers 3 from the device 1 to the container filling device 7, the container guide 72 of the container filling device 7 and the guide 2 of the device 1 are arranged at the same height level. In other words, the guide height level 20 corresponds to the receiving height level 73.

The plurality of filling members 70 for filling one respective container 3 are arranged above the container guide 72.

Figure 3:
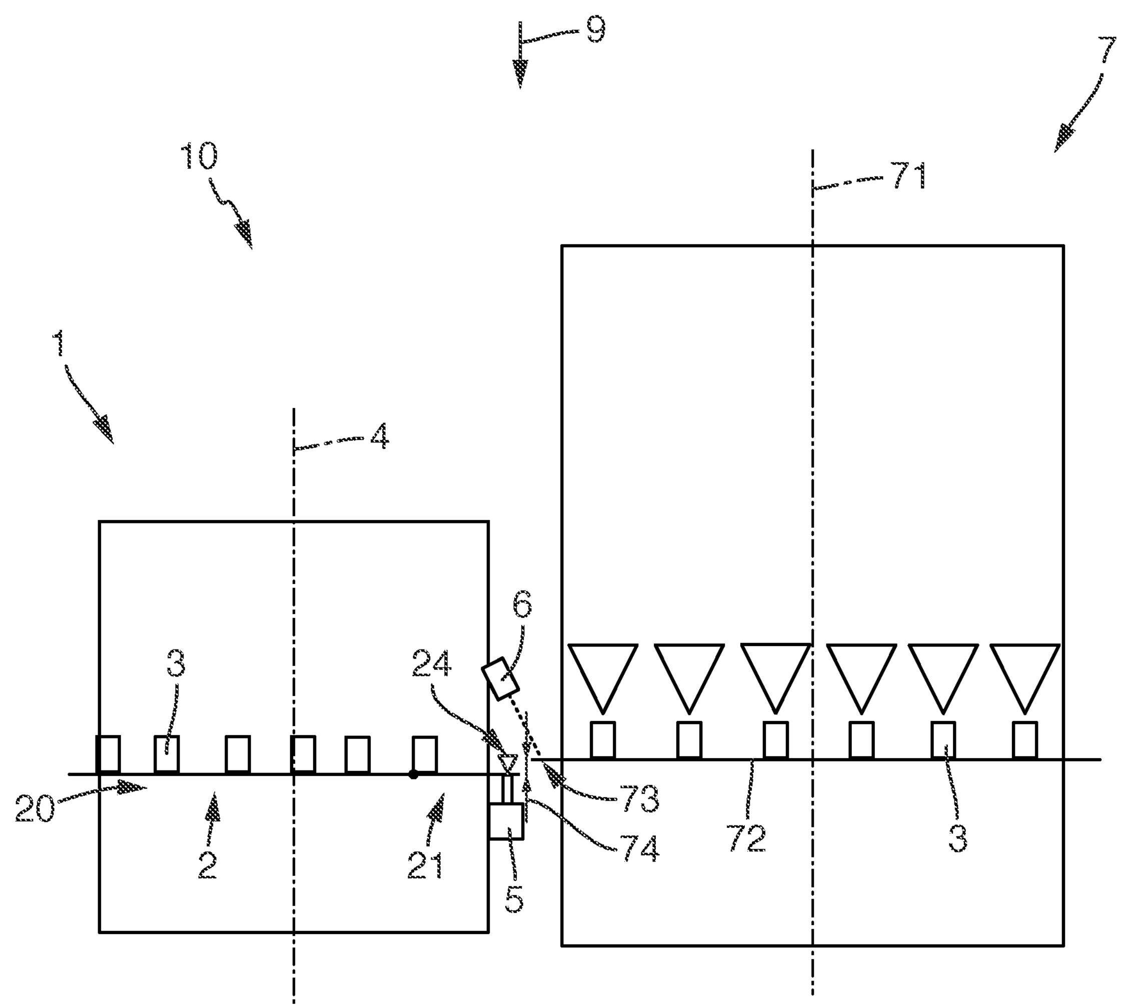
FIG. 3 shows schematically a further side view of the filling system of FIG. 1.

FIG. 3 shows schematically a further side view of the filling system 10 of FIG. 1, in which the container filling device 7 in comparison with FIG. 2 has been subjected to thermal expansion due to a temperature development which has been produced during the operation of the container filling device 7. The result of the thermal expansion, amongst other things, is that with the heated container filling device 7, the receiving height level 73 is higher in comparison with FIG. 2, as shown in FIG. 3. By this thermal expansion and the resulting displacement of the receiving height level 73 counter to the direction of gravity 9 a height offset 74 is produced between the guide height level 20 of the guide 2, which substantially remains the same, and the receiving height level 73.

In order to compensate for this height offset 74 produced by the thermal expansion of the container filling device 7, the transfer portion 21 is configured to be height-adjustable.

The device 1 has an optional sensor 6 for detecting the currently present receiving height level 73 of the guide 72 of the container filling device 7 receiving the containers 3, which in the present case is an optically measuring sensor 6.

Alternatively, the sensor 6 may also be a mechanically scanning sensor and/or a thermal sensor.

Moreover, the device 1 has an adjusting device 5 which is arranged below the transfer portion 21, the sensor 6 communicating therewith. To this end the adjusting device 5 is designed to adjust the height level of the transfer portion 21, based on a value detected via the sensor 6, in the present case such that the height level of the transfer portion 21 corresponds to the currently determined receiving height level 73.

Alternatively or additionally, the adjusting device 5 may be designed to perform a time-dependent adaptation of the height level of the transfer portion 21. In some embodiments, this adaptation takes place after a temperature determination has been initially carried out, in which at the start of the operation of the system 10 the current temperature of the container filling device 7 is determined at least once at the start.

The temperature, for example, may also be measured by a measurement of the temperature of an oil bath.

Based on the temperature, an adaptation of the height level of the transfer portion 21 may also be carried out over a preset time. In other words, based on an initial temperature the chronological development of the temperature is estimated so that the alteration to the height level to be adapted may be determined solely via the time which has elapsed.

Figure 4:
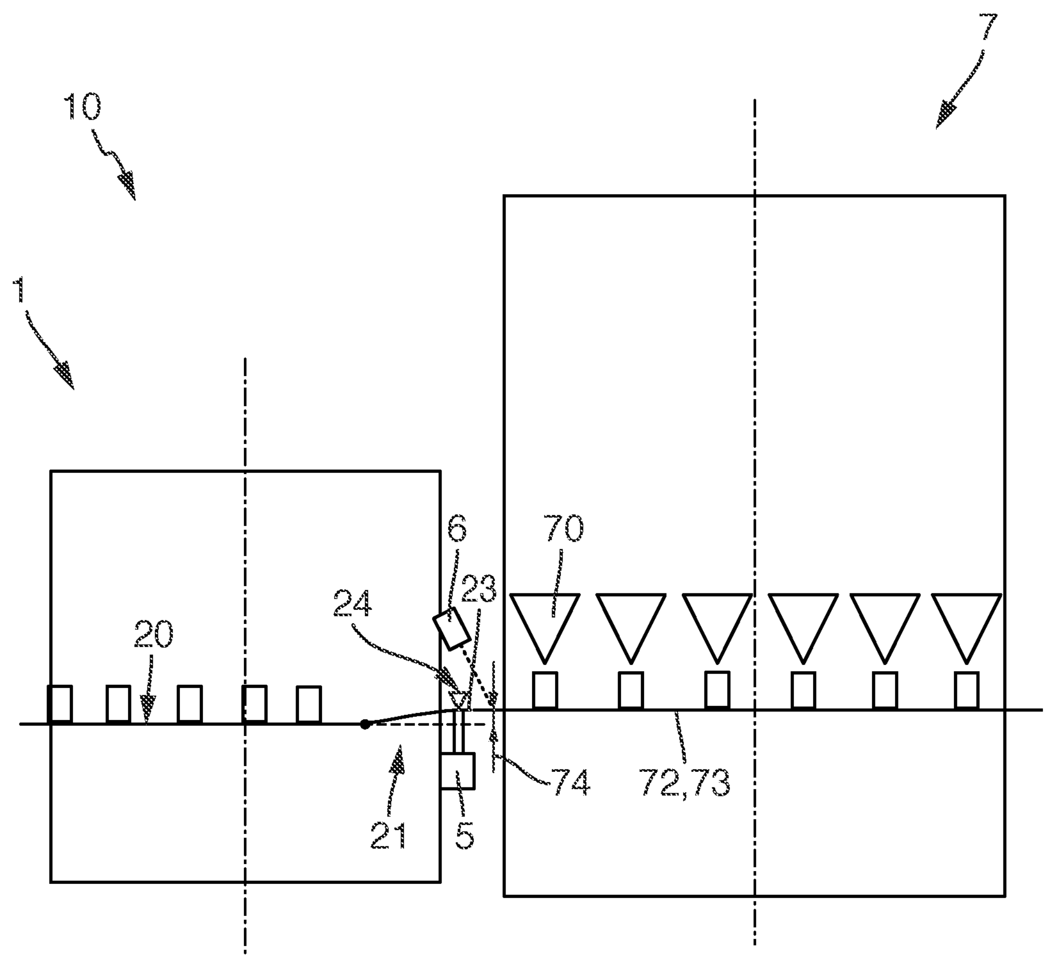
FIG. 4 shows schematically a further side view of the filling system of FIG. 1.

FIG. 4 shows schematically a further side view of the filling system 10 of FIG. 1, in which in comparison with FIG. 3 the height level 24 of the transfer portion 21 is altered by the adjusting device 5 such that the height level 24 corresponds to the receiving height level 73. To this end the adjusting device 5 has generated a lift which has lifted the end portion 23 of the transfer portion 21 from the guide height level 20 to the current receiving height level 73.

In the present case the sensor 6 is designed to detect one respective value at continuous time intervals and to communicate this value to the adjusting device 5. Based on the continuously transmitted values of the sensor 6, the adjusting device 5 is also designed to adapt the height level 24 of the transfer portion 21 in each case automatically to the last determined value of the receiving height level 73.

The transfer portion 21 is configured such that when the transfer portion 21 is adjusted to a height level 24 which is different from the guide height level 20, viewed in the transport direction 8 (see FIG. 1), the transfer portion 21 is continuously altered from the guide height level 20 to the adjusted height level 24 of the transfer portion 21. In other words, viewed in the transport direction 8, the start portion 22 of the transfer portion 21 is always at the guide height level 20 and the end portion 23 is at the adjusted height level 24. The region between the start portion 22 and the end portion 23 alters in this case continuously from the guide height level 20 to the adjusted height level 24.

Figure 5:
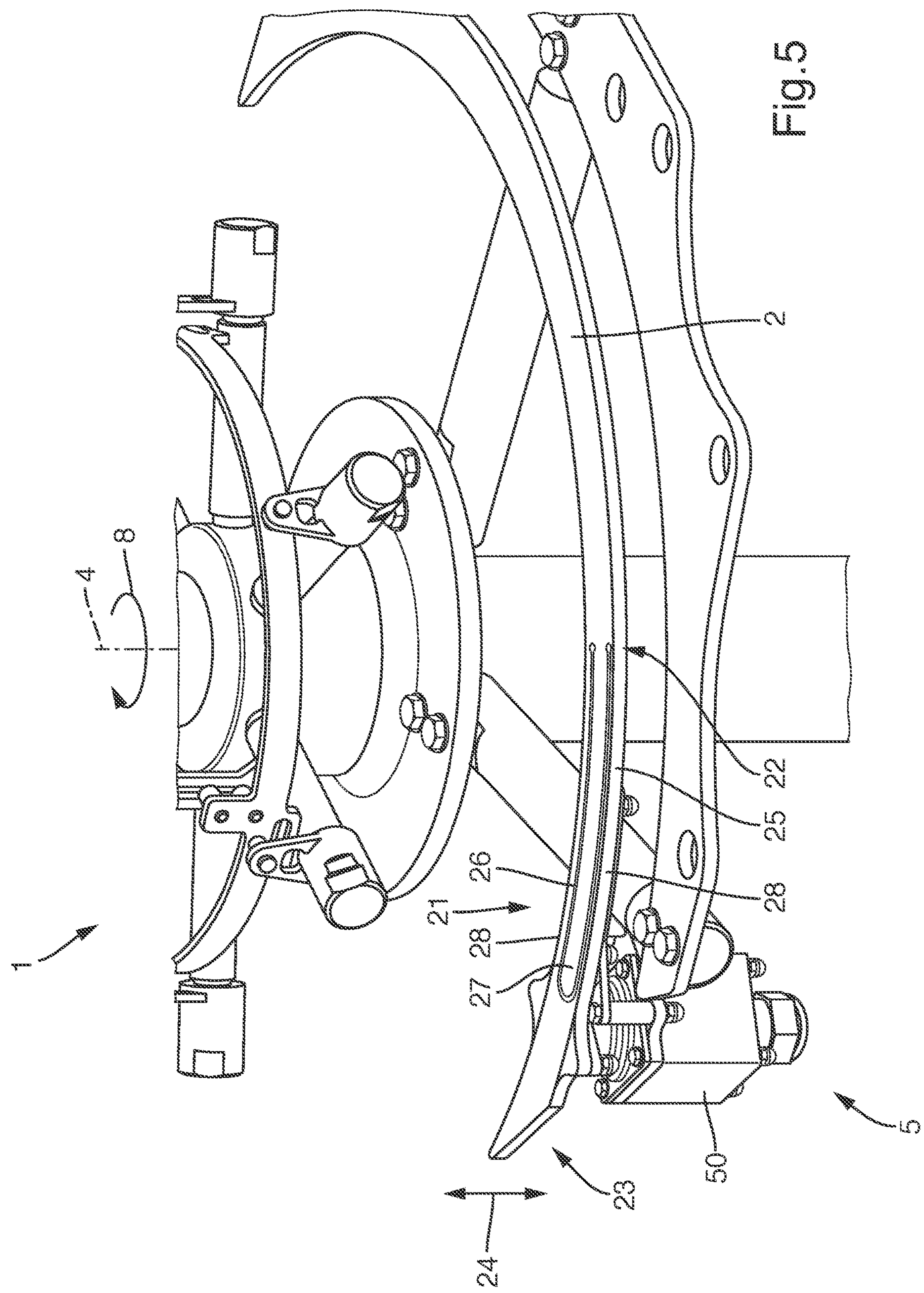
FIG. 5 shows schematically a perspective side view of a device for supplying containers to a container filling device of the filling system of FIG. 1.

FIG. 5 shows schematically a perspective side view of the device 1 for supplying containers 3 to the container filling device 7 of the filling system 10 of FIG. 1. The guide 2 is configured in the form of a horizontally oriented guide plate. The transfer portion 21 is configured integrally with the guide plate and/or formed from the guide plate.

To this end, the guide plate has an elongated U-shaped recess 26 which extends in the transport direction 8 such that the end portion 23 is only connected via two webs 28 which are thin-walled in comparison with the thickness of the guide plate. The remaining material 27, which is separated and/or cut away from the thin webs 28 and the end portion 23 by means of the recess 26, extends within the two thin-walled webs 28.

As a result, the transfer portion 21 is configured via the webs 28 in the form of a spring element 25. Due to the thin walls of the webs 28 in comparison with the thickness of the guide plate of the guide 2 upstream of the transfer portion 21 and/or the remaining material 27, the transfer portion 21 is resiliently configured in comparison with the remaining guide 2. Thus the transfer portion 21 takes the form of a resilient spring element 25.

The adjusting device 5 is arranged below the end portion 23 of the transfer portion 21. In the present case, the adjusting device has an optional stepping motor 50 which is oriented such that a lift generated by the stepping motor 5 effects an alteration to the height level 24 of the end portion 23 of the transfer portion 21.

As the transfer portion 21 is configured as a resilient spring element 25 which is configured integrally with the guide 2, when the end portion 23 of the transfer portion 21 is lifted or lowered to a height level 24 which is different from the guide height level 20 of the remaining guide 2, this leads to a continuous alteration in the height level in the transport direction 8 from the start portion 22 as far as the end portion 23, by the spring element 25 being resiliently deformed.

Figure 6:
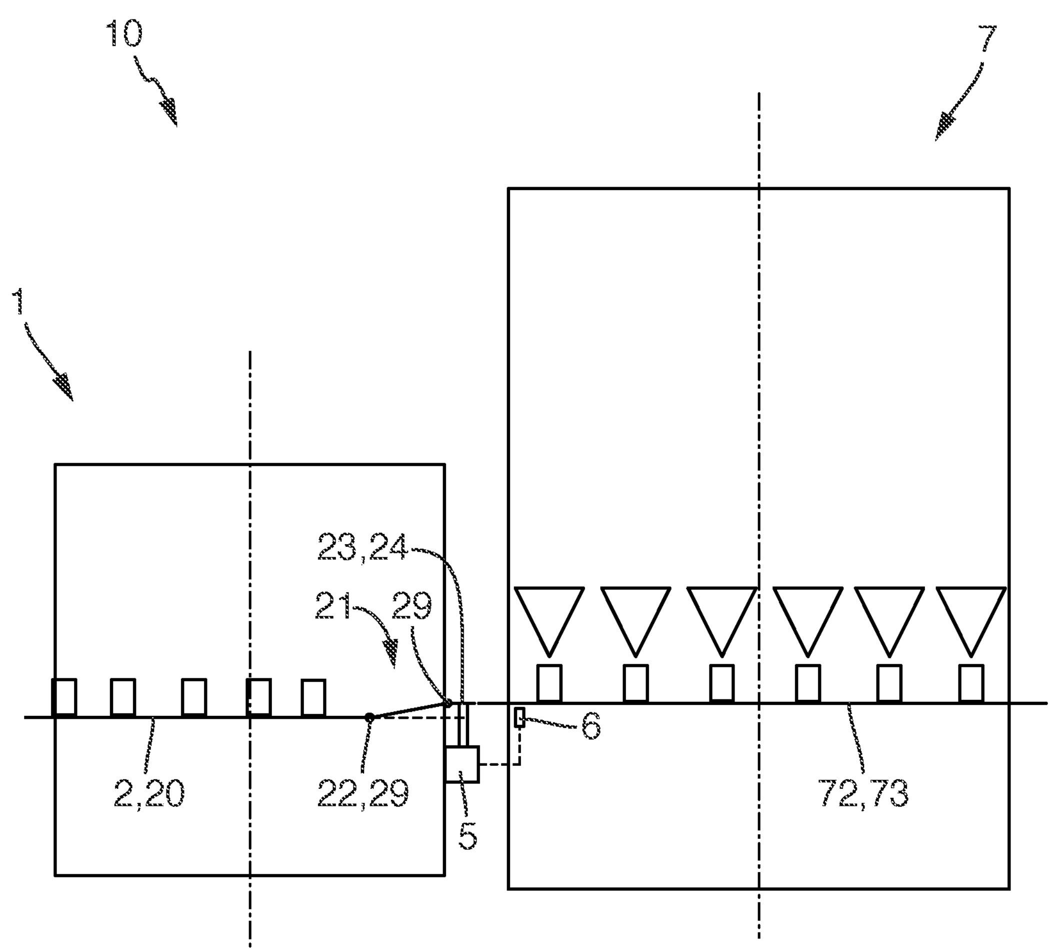
FIG. 6 shows schematically a side view of a filling system according to a further embodiment.

In FIG. 6, a side view of a filling system 10 according to a further embodiment is shown schematically. The filling system 10 substantially corresponds to that of FIGS. 1 to 4, wherein instead of the optical sensor the device 1 has a temperature sensor 6 which is connected to the adjusting device 5. The adjusting device 5 and/or a controller/regulator (not shown) of the adjusting device 5, based on the temperature measured by the sensor 6, determines the current receiving height level 73 of the container guide 72 of the container filling device 7 and adjusts the end portion 23 of the transfer portion 21 to this height level 24.

In contrast to the embodiment of the transfer portion 21 according to FIGS. 1 to 5, the transfer portion 21 according to FIG. 6 in each case has a joint 29 at the start portion 22 and in the region of the end portion 23. In other words, the guide 2 and the end portion 23 are connected via a ramp portion extending between the start portion 22 and the end portion 23.

If applicable, all of the individual features which are shown in the exemplary embodiments may be combined together and/or exchanged with one another without departing from the scope of the invention.

The invention claimed is:

1. A device for supplying containers to a container handling device comprising:

a guide disposed at a predetermined guide height level and configured to guide a container on a container base of the guide, wherein the guide comprises a transfer portion configured to transfer the container to a receiving device of the container handling device, and wherein the transfer portion is height-adjustable;

an adjusting device configured to adjust a height level of the transfer portion; and a sensor configured to detect a receiving height level of a container guide of the container handling device.

2. The device of claim 1, wherein the transfer portion is configured such that when the transfer portion is adjusted to a height level that is different from the predetermined guide height level, viewed in a direction of transport of the container, a height of the transfer portion changes from the predetermined guide height level to an adjusted height level of the transfer portion.

3. The device of claim 1, wherein the adjusting device comprises a lifting drive.

4. The device of claim 3, wherein the lifting drive comprises an actuator or a stepping motor.

5. The device of claim 1, wherein the adjusting device is disposed below the transfer portion.

6. The device of claim 1, wherein the sensor is connected to the adjusting device.

7. The device of claim 6, wherein the adjusting device, based on a value detected via the sensor, is configured to adjust the height level of the transfer portion such that the height level of the transfer portion substantially corresponds to the receiving height level.

8. The device of claim 1, wherein the sensor comprises at least one of an optically measuring sensor, a mechanically scanning sensor, or a thermal sensor and the adjusting device comprises a controller or a regulator configured to determine a predetermined value for the height level of the transfer portion based on an input signal of the sensor.

9. The device of claim 1, wherein the sensor is configured to detect values for the receiving height level.

10. The device of claim 1, wherein the sensor is configured to detect values for the receiving height level at regular time intervals.

11. The device of claim 10, wherein the adjusting device is configured to adapt the adjustment of the height level of the transfer portion automatically based on the values detected by the sensor.

12. The device of claim 1, further comprising a thermal sensor, wherein the adjusting device comprises a controller or a regulator configured to determine a predetermined value for the height level of the transfer portion based on an input signal of the thermal sensor.

13. The device of claim 12, wherein the controller or the regulator is further configured to change the predetermined value according to a preset time.

14. A filling system comprising:

a container handling device configured to handle containers; and the device of claim 1.

15. A device for supplying containers to a container handling device comprising:

a guide disposed at a predetermined guide height level and configured to guide a container on a container base of the guide, wherein the guide comprises a transfer portion configured to transfer the container to a receiving device of the container handling device, and wherein the transfer portion is height-adjustable;

an adjusting device disposed below the transfer portion and configured to adjust a height level of an end portion of the transfer portion; and a sensor configured to detect a receiving height level of a container guide of the container handling device and connected to the adjusting device.

16. The device of claim 15, wherein the sensor comprises at least one of an optically measuring sensor, a mechanically scanning sensor, or a thermal sensor.

17. The device of claim 15, wherein the transfer portion is configured as a spring element.

18. A filling system comprising:

a container handling device configured to handle containers; and the device of claim 15.

* * * * *